Oct. 23, 1956  B. N. MAAS  2,767,637
PRESSURE REGULATING MECHANISM
Filed Nov. 26, 1951  4 Sheets-Sheet 1

BERNARD N. MAAS,
INVENTOR.

BY
ATTORNEY

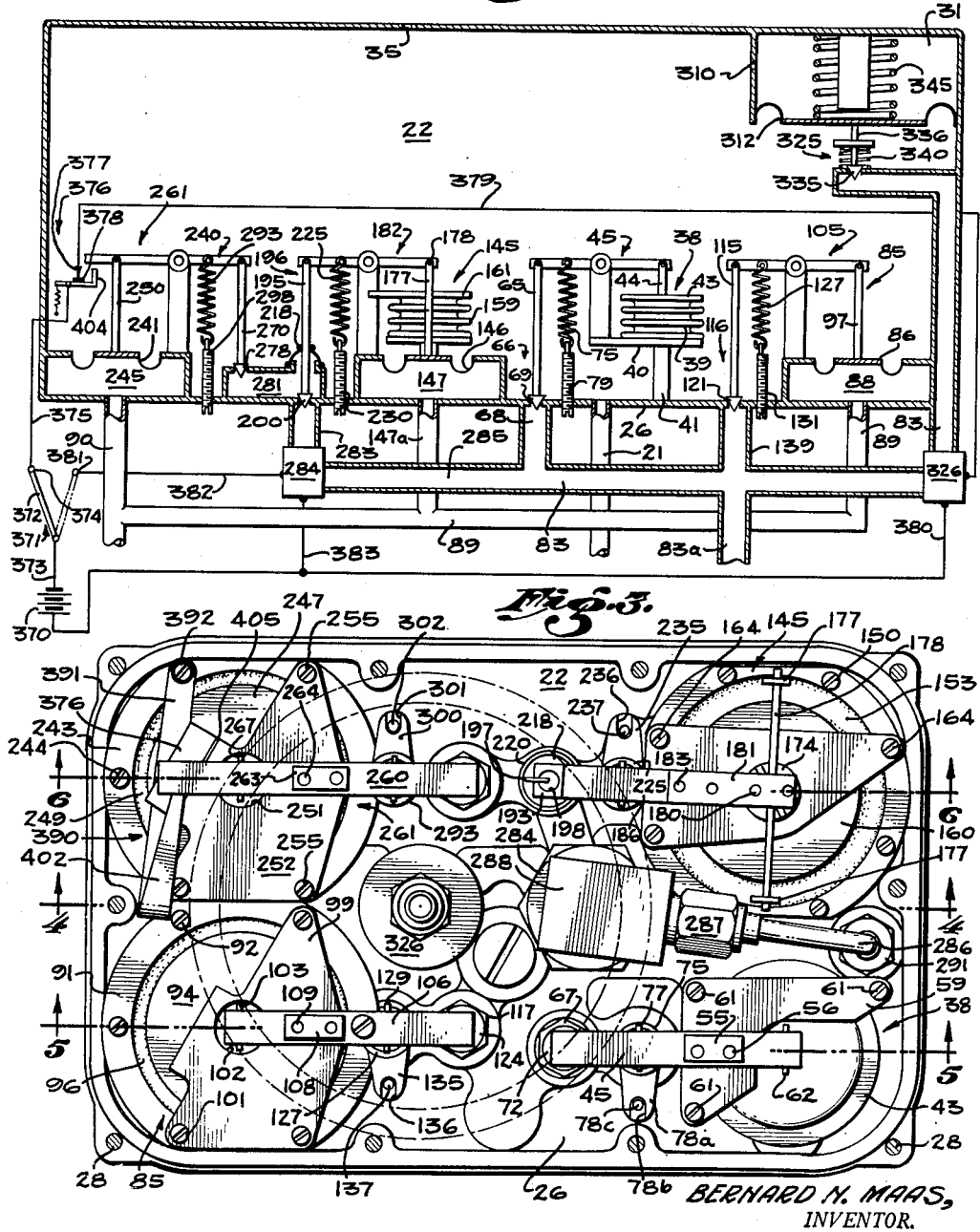

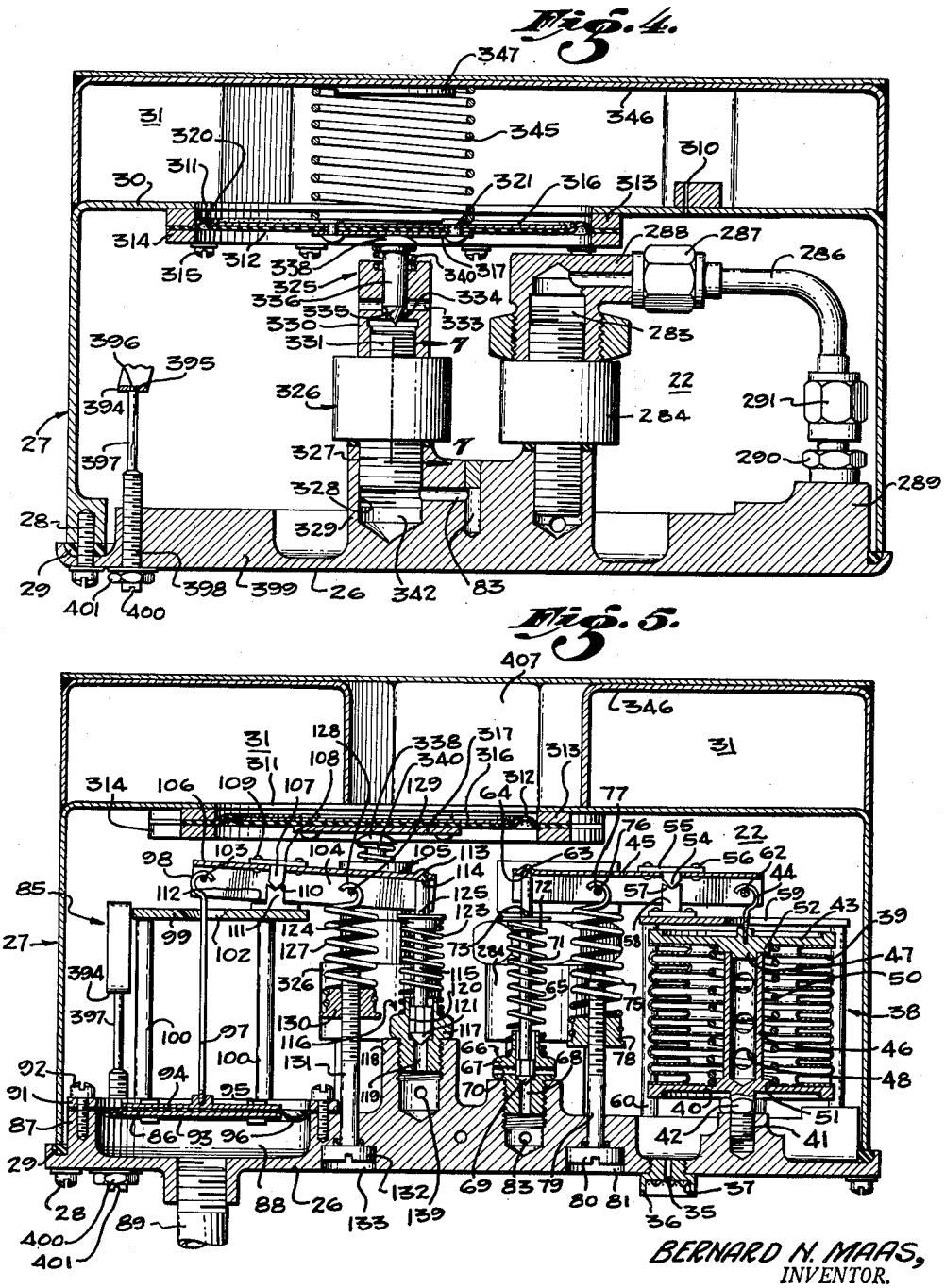

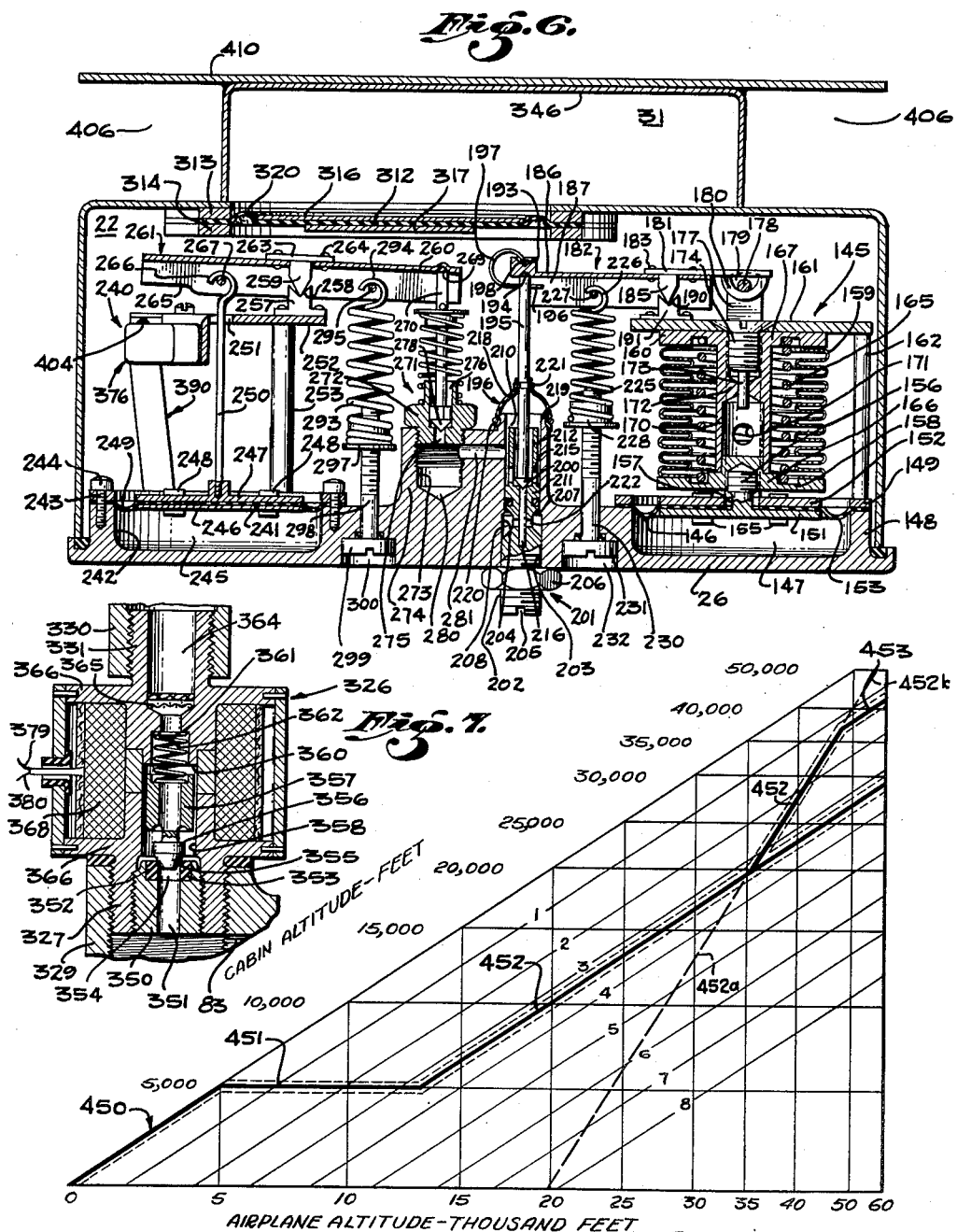

United States Patent Office 2,767,637
Patented Oct. 23, 1956

2,767,637

PRESSURE REGULATING MECHANISM

Bernard N. Maas, Pacific Palisades, Calif., assignor to The Garrett Corporation, Los Angeles, Calif., a corporation of California Application November 26, 1951, Serial No. 258,146

28 Claims. (Cl. 98—1.5)

This invention relates generally to pressure regulating or control means and relates more particularly to means or mechanisms for controlling the pressure in enclosures.

While the invention has particular utility in connection with pressurized ventilation in enclosures such as aircraft cabins and the like, and is shown and described embodied in such an installation, it is to be understood that its utility is not confined thereto, and it is to be further understood that the term "aircraft," as used herein refers to any type of device that travels through the earth's atmosphere.

Generally, in cabin pressurizing and ventilating systems, there is means, such as an air pump or supercharger for supplying air under pressure to the cabin, with one or more control valves for controlling the outflow of air from a discharge or outlet duct or ducts.

The pressurizing of the aircraft cabin is for the purpose of providing adequate air under sufficient pressure to prevent discomfort or injury to the occupants of the cabin.

Various cabin pressurizing systems are used for aircraft cabins. In one such system, for example, cabin pressure is permitted to remain substantially the same as ambient atmospheric pressure until a predetermined altitude has been reached and is maintained at a substantially constant pressure between that altitude and a second predetermined higher altitude. Between the second predetermined altitude and a third predetermined higher altitude, the cabin pressure is maintained at a substantially fixed differential relative to external atmosphere. Under normal operating conditions this fixed differential pressure is relatively high and is satisfactory in military aircraft when said aircraft are not in a combat zone.

However, such a relatively high differential pressure for the cabin of military aircraft may be unsuited for combat and may then even be a dangerous hazard to the aircraft's personnel. For example, should there be a major perforation of the wall of the pressurized cabin as a result of enemy fire, or for any other reason and said perforation is of such size that air will escape from the cabin faster than the supercharging apparatus can pump fresh air into the cabin to replace it, the cabin pressure may drop to a lower level at a rate of change greater than that at which the occupants can continue to maintain normal and rational body and mental functioning. In this connection, the magnitude of the change must also be considered.

Such a sudden drop in pressure is commonly termed explosive decompression and may have serious, if not fatal, effect on the personnel within said cabin.

In explosive decompression, assuming a perforation or rupture of a given maximum size in the cabin wall, the volume of the cabin determines the maximum safe ratio between the pressures of air in the human body before and after explosive decompression. The pressure of air in the human body before explosive decompression equals cabin pressure minus the partial pressure of water vapor in the human body at body temperature, which equals 1.85 inches of mercury. The pressure of air in the human body after explosive decompression equals atmospheric pressure minus said partial pressure of water vapor in the human body at body temperature. If the maximum safe ratio between the pressures of air in the human body before and after explosive decompression is not to be exceeded, then at high altitudes the differential between cabin and atmospheric pressures must decrease as the aircraft ascends.

The decrease in pressure above the altitude at which the maximum safe ratio is reached for military operations should be brought about in a manner which will maintain a substantially constant ratio between cabin and atmospheric pressure values, each diminished by a constant. The most desirable ratio is one in which the value of its constant is 1.85 (the vapor pressure in inches of mercury within the human lung at body temperature). The greatest protection at maximum safe pressure against the injurious effect of explosive decompression can be attained where a constant value is maintained for the ratio of $(C-1.85)/(A-1.85)$, where $C$ represents cabin pressure and $A$ represents atmospheric pressure, both expressed in inches of mercury absolute. Accordingly, another object of the invention is to provide a pressure control system adapted to maintain a substantially constant ratio between cabin pressure minus 1.85 and atmospheric pressure minus 1.85, or between cabin and atmospheric pressures, each diminished by any selected constant, which may be zero.

As hereinabove mentioned, another factor to be considered in connection with the problem of preventing injury to occupants of aircraft due to explosive decompression is the ratio of the total change to the final pressure. In Fig. 8, the line 452 and its extensions 452a and 452b represent the ratio of gas expansion or physiological expansion ratio for various altitudes.

Thus the seriousness of these problems is proportional to the magnitude of the differential between cabin and ambient pressure for which the pressure regulating apparatus is set to operate at the higher altitudes. Consequently, these problems may be dealt with by providing means for reducing the differential pressure between that in the cabin and ambient atmosphere during combat operations, and it is one object of the present invention to provide pressure regulating or control mechanism which will most advantageously control the pressure conditions within the cabin under the various conditions which will be encountered in the operation of the aircraft, particularly military aircraft.

Another object of the invention is to provide a differential changing control which is adapted to override a control which normally operates to maintain a fixed (normal) differential between cabin and ambient pressures in at least one stage of operation of the regulating system. Thus the regulator would normally maintain a maximum differential in this stage of operation, but would be adapted, under selective control, to shift from high to low or ratio and back to high differential while operating under external atmospheric conditions normally calling for high differential in at least an upper portion of the normal high differential range.

Still another object of the invention is to provide a pressure regulating system incorporating a differential changer, the operation of which may be initiated by the pilot or other crew member, and which is then adapted to automatically change the differential from a predetermined high limit to a predetermined low limit, or vice versa, depending upon the direction in which said control is set for operation.

When a plane enters a combat zone, an area generally determined geographically, it is desirable that the change from high to low differential be brought about, in order that the low differential may be arrived at before the plane actually becomes subject to possible perforations from enemy fire. Should the wall of the cabin be ruptured to an extent such as to cause substantially instantaneous decompression, the effect upon the occupants would be injurious to an extent which is a straight line function of the altitude of the plane, and, at extremely high altitudes, could be fatal. Accordingly, the invention contemplates the controlled reduction of differential at a maximum rate of rapidity consistent with the avoidance of injurious consequences.

Still another object of the invention is to provide a ratio control in an altitude range immediately preceding the low differential range.

Excessive rapidity of increase in differential, which may be termed implosive compression, also produces deleterious effects upon the personnel of the plane. Too rapid an increase in cabin pressure can seriously affect the middle ear of an occupant. Therefore, a further object of the invention is to provide cabin pressure regulating mechanism capable of affecting a considerably slower pressure change from low to high differential than the pressure change to low from high differential.

Another object of the invention is to provide a mechanism of the present character which may be calibrated with much greater ease than heretofore in cabin pressure regulators.

Still another object of the invention is to provide mechanism of this character having simple switchover means.

Further objects of the invention are to provide a single unit control mechanism that is extremely simple in construction and operation, that is easier to manufacture and assemble and that is relatively inexpensive to manufacture.

Other objects and advantages of the invention will appear in the following part of the specification.

Referring to the drawings which are for illustrative purposes only:

Fig. 2 is a sectional view of a cabin pressure regulating unit with the mechanism shown schematically;

Fig. 3 is a plan view of a regulator unit with one of the housing sections removed;

Fig. 4 is a sectional view taken on line 4—4 of Fig. 3;

Fig. 5 is a sectional view taken on line 5—5 of Fig. 3;

Fig. 6 is a sectional view taken on line 6—6 of Fig. 3;

Fig. 7 is a section taken on line 7—7 of Fig. 4, and

Fig. 8 is a graph showing a flight schedule affected by regulating mechanism embodying the present invention.

Figure 1:
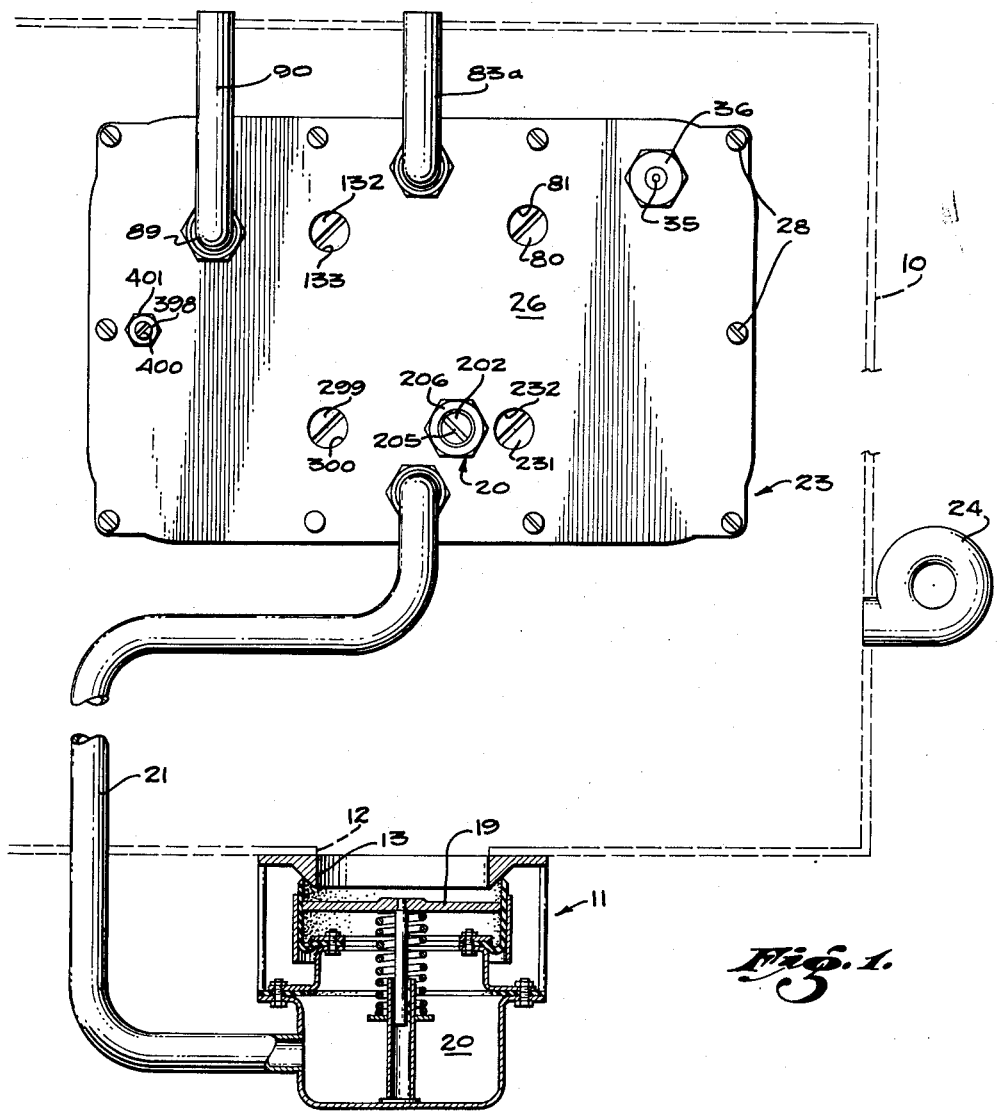
Fig. 1 is a diagrammatic view showing a cabin having a pressure regulating unit controlling an outflow valve.

Referring to Fig. 1, which shows a schematic or diagrammatic representation of a cabin pressure system embodying the present invention, the cabin is indicated at 10.

The system may include a plurality of slave valve units, one of which is indicated generally at 11 for purposes of illustration. The cabin is provided with an outlet opening 12 surrounded by a valve seat 13 of the valve unit 11 which may be of the type disclosed in the Arthur, et al. Patent No. 2,531,100. This valve includes a movable valve member 19 acted upon by cabin pressure on one of its sides and by the pressure in a control chamber 20 upon its other side. The control pressure chamber 20 of the unit 11 is connected by means of a conduit 21 with the control pressure chamber 22 of a pressure regulating mechanism or unit, indicated generally at 23. The unit 23 is shown as being located within the pressurized portion of cabin 10, said cabin being supplied with air by any suitable means such as a pump or supercharger 24. Any other suitable means may be employed for providing air under pressure to the cabin, the supercharger 24 being indicated merely as one type of mechanism for providing such air.

The pressure regulating mechanism or unit 23 has a means for performing a plurality of functions. There is an isobaric control, a high differential control, a ratio control, a low differential control, and a cabin repressurization rate control. The various means for performing these functions are arranged in the small package unit which is relatively compact and light in weight.

The regulator 23 comprises a base 26 and a generally cup-shaped rectangular cover, indicated generally at 27. The cover is secured to the base by screws 28, and a cover gasket 29 provides a seal between said base and the free edge of the cover. The cover includes a transverse wall 30 which separates the interior of said cover into the control pressure chamber 22 and another chamber 31 which is termed a capacitance or rate chamber. The isobaric, high differential, ratio, and low differential control means are located within the control chamber 22 and control the pressure therein by controlling the flow of air relative thereto. More particularly said means control the outflow of air from the chamber 22, air being bled into said chamber through a bleed 35 in a plug 36 having a filtering element 37 for filtering the air entering said bleed. The plug 36 is adapted to be screwed into a tapped opening provided therefor in the base 26.

The isobaric control means is indicated generally at 38 and includes a bellows 39 which may be evacuated or which may be filled with a gas such as nitrogen, air, or other known gas. One end of the bellows 39 is secured to a plate 40 on a supporting stud 41 which is attached to the base 26 of the unit, said stud 41 having a threaded end adjustably threaded to an opening provided therefor in said base 26. A nut 42 on said stud locks same in adjusting positions.

The upper end of the bellows 39, as viewed in Fig. 5, is secured to a plate 43 having a hook 44 secured thereto for connecting said plate with a lever or rocker arm 45. The plate 43 is movable with expansion and contraction of the bellows 39 but is limited in its downward movement by a tubular stop 46 which comprises an integral part of the plate 40 and extends axially within the bellows 39. The plate 43 is provided with an inwardly extending projection 47 adapted to engage the upper free end of the stop 46, the latter being provided with openings 48 to equalize the pressure within the stop with that outside of said stop and within the bellows 39. A spring 50 is provided within the bellows 39 and reacts between the plates 40 and 43, said spring being retained in position by spring retaining portions 51 and 52 of the plates 40 and 43 respectively.

The lever 45 may be of any suitable construction but is shown as being channel shaped. Intermediate the ends of lever 45 is a rocking member 54 attached to a plate 55 which, in turn, is secured to the lever 45 by means of rivets 56 or the like, the member 54 extending through an opening in the closed side of the lever 45. The lower or free end of the member 54 has a relatively sharp edge received in a notch 57 in the free end of a fulcrum member 58 secured to a fulcrum plate 59 supported above the bellows 39, as viewed in Fig. 5, by a plurality of spacer studs 60 attached at the lower ends to the base 26 and having the fulcrum plate 59 secured to their upper ends by means of screws 61, Fig. 3. The plate 59 is generally L-shaped, as best shown in Fig. 3, to provide clearance for the hook 44 which is hooked onto a pin 62 adjacent one end of the lever or rocker arm 45. The pin 62 is suitably secured in openings provided therefor in the side walls of the arm 45, said pins being spaced sufficiently from the closed side of the rocker arm so as to provide adequate clearance for the hook and permit proper operation of the mechanism.

Adjacent the opposite end of the rocker arm 45, the bottom wall of the channel is provided with an outwardly pressed recess 63 for reception of a rounded free end 64 of a movable valve stem 65 of a metering valve, indicated generally at 66. The metering valve 66 includes a seat member 67 having a bore 68 extending axially therein and controlled by the valve member 69 which controls the flow between the bore 68 and a cross bore 70 which communicates with the chamber 22. The valve member 69 is slidably received in an axial bore, the upper end of the seat member 67 and the stem 65 being urged upwardly by a relatively light spring 71 which reacts between the seat member 67 and a spring retainer 72 suitably attached to the valve stem 65 adjacent the upper end thereof by a pin 73 or any other suitable means. The isobaric mechanism is loaded by extension spring 75, the tension of which is adjustable. The upper end of the spring 75 is provided with a hook-like end 76 engageable with a pin 77 mounted between the sides of the rocker arm 45. The lower end of the spring 75 is secured to a spring retainer 78 having a threaded axial bore in which is received an adjusting screw 79 which extends through an opening provided therefor in the base 26 and which is provided with an adjusting head 80 disposed in a recess 81 provided therefor in said base 26. The spring retainer 78 has a lateral projection 78a provided with a notch 78b in the free end thereof in which is received a guide pin 78c press-fitted or otherwise suitably secured in the base 26. The pin 78c prevents rotation of the spring retainer 78 but said extension 78a slides longitudinally on said pin when the spring tension is adjusted. The passage 68 of the metering valve 66 communicates with a passage 83 in the base 26, said passage 83 having an atmospheric connection 83a, as best shown in Fig. 2.

The high differential control mechanism is indicated generally at 85 and comprises a movable wall or flexible diaphragm 86 responsive to variations in the differential of pressures on opposite sides thereof. The diaphragm 86 is mounted at the upper or free end of a flange 87 upstanding from the bottom of the base 26 so as to provide a pressure chamber 88 having a connection with atmosphere by means of ducts 89 and 90. The diaphragm 86 is marginally secured to the flange 87 by means of a ring 91 and screws 92. A central area of the diaphragm 86 is secured between a pair of plates 93 and 94 which are attached by means of rivets 95 or the like. The plates 93 and 94 are of smaller diameter than the inside diameter of the flange 87 so as to leave an annular convolution 96 between said plates and flange which permits proper operative movements of the diaphragm. There is a rod 97 having one end threaded into a threaded axial opening in the upper plate 94, said rod extending upwardly, as shown in Fig. 5, and being provided with a hook 98 at its upper free end. Above the diaphragm and in spaced relation thereto is a fulcrum plate 99 supported by studs 100 which have their lower ends screwed into threaded openings in the ring 91. Plate 99 is secured to the studs by means of screws 101. The plate is provided with an opening 102 through which the rod 97 freely extends, the hook 98 of said rod engaging a pin 103 extending between the side walls 104 of a lever or rocker arm indicated generally at 105. The rocker arm 105 is channel-shaped and the wall 106 connecting the side walls 105 is at the top. Intermediate the ends of the rocker arm 105, the wall 106 has an opening through which projects a fulcrum member 107 secured to a plate 108 which, in turn, is secured by rivets 109 to the wall 106. The lower end of the fulcrum member 107 is provided with a relatively sharp edge received in V-shaped notch 110 of a fulcrum member 111 which is secured to the plate 99 by any suitable means such as rivets 112. The notch 110 has a greater angle than the angle of the sharpened end of the member 107 to permit proper operative movements of the lever 105. Adjacent the end of the lever 105, opposite the pin 103, is an outwardly formed recess 113 in the wall 106. The recess receives the rounded upper end 114 of a valve stem 115 of a metering valve, indicated generally at 116. The metering valve 116 includes a seat member 117 screwed into an opening provided therefor in a boss 118 upstanding from the base 26. The seat member 117 is provided with an axial passage 119 which is enlarged at 120 for slidable reception of a valve member 121 controlling air flow in the passage 119. Communication between the passage 119 and the chamber 22 is past the valve member 121 when the latter is open, along cutaway or profile sides of said valve member. The valve stem is urged upwardly by a light spring 123 which reacts between the valve seat member 117 and the spring retainer 124, the retainer being held against upward movement by a pin 125. The high differential mechanism is loaded by an extension spring 127 which has a hook-shaped end 128 engaging a pin 129 secured in the side walls 104 of the rocker arm 105. The opposite end of the spring is secured to a spring retainer 130 having an axial threaded bore therethrough in which is received the threaded end of an adjusting screw 131 rotatable in an opening provided therefor in the base 26. The screw 131 is provided with an adjusting head 132 disposed in a recess 133 formed in the outer side of the base 26. The spring retainer 130 is provided with a lateral member 135 (Fig. 3) having a notch 136 in the outer end thereof for slidable reception of a pin 137 having one end secured in the base 26 and extending from said base in substantially parallel relationship to the screw 131, said pin preventing rotation of the spring retainer 130 when adjustment of the tension of spring 127 is made.

The bore 119 of valve 116 communicates with the lower end of the bore in which the seat 117 is secured and said bore is connected by means of a passage 139, Figs. 2 and 5, which, in turn, is connected with the passage 83 which has the atmospheric connection 83a.

The ratio control is indicated generally at 145 and comprises the diaphragm 146 subjected on one side to pressure in a chamber 147 connected by a conduit 147a (Fig. 2) with the passage 89 which is in turn connected to atmosphere. The other side of the diaphragm 146 is subjected to the pressure in the control chamber 22. There is an annular flange 148 upstanding from the base 26 and said diaphragm 146 is marginally clamped to the free end of said flange 148 by means of a ring 149 secured by screws 150. The diaphragm 146 has a central area reinforced by plates 151 and 152 of smaller diameter than the inside diameter of flange 148 thereby leaving an annular convolution 153 between said plates and ring so that there will be proper operative movements of the diaphragm. The plates 151 and 152 are secured together by any suitable means such as rivets 155, the plate 151 having an upstanding integral threaded member 156 received through an opening 157 in the upper plate 152 and threaded into an axial opening provided therefor in a plate 158 to which the lower end (as viewed in Fig. 6) of an evacuated bellows 159 is secured. Thus the lower end of the bellows is movable with the diaphragm 146 as will be more particularly described hereinafter. The upper end of the bellows 159 is secured to a plate 160 which, in turn, is secured to a plate 161 by soldering or any other suitable means so that the upper end of the bellows is fixed, said plate 161 being mounted to the upper ends of studs 162 having their lower ends threaded in suitable openings provided therefor in the ring 149. The plate 161 is secured to the studs by screws 164, Fig. 3. Within the bellows 159 is a compression spring 165 reacting between the plates 158 and 160 and urging extension of the bellows. The ends of the spring are disposed in retainer studs 166 and 167 of the plates 158 and 160 respectively. The upper plate 160 is provided with a depending tubular stop 170, the lower end of which is adapted to engage the lower plate 158 to limit compression of the bellows 159. The tubular stop 170 is provided with an opening 171 therein to equalize the pressure therein with respect to the pressure within the bellows and at the exterior of said stop. The stop 170 is formed with a partition 172 adjacent the upper end and having an opening therethrough for reception of a tube 173 of a screw plug 174 threaded into the upper end of the stop 170. The tube 173 is used in evacuation of the bellows.

The upper plate 152 of the diaphragm assembly is provided with oppositively arranged upstanding arms 177, Figs. 2 and 6, which extend above the plane of the plate 161. A pin 178 has end portions which are received in openings provided therefor in the arms 177 adjacent the upper free end thereof so that said pin extends between said arms 177. The pin 178 is also received in a semi-circular opening 179 defined by an arcuately shaped member 180 secured to a member 181 attached to a rocker arm or lever, indicated generally at 182, and which forms an extension of said lever. The member 181 is shown as being secured to the rocker arm 182 by rivets 183 and the arcuate shaped member 180 is secured by any suitable means to the member 181 adjacent the free end thereof. The diaphragm 146 and bellows 159 are connected to the lever or rocker arm 182 by means of said pin 178 and arcuately shaped member 180. The member 181 is provided with a depending fulcrum member 185 which extends through an opening provided therefor in the wall 186 which connects the side walls 187 of the rocker arm 182 which is channel-shaped with the open side of the channel at the bottom. The fulcrum member 185 has a sharpened edge at the lower end thereof rockably received in a V-shaped notch 190 of a fulcrum member 191 secured to the upper side of the fixed plate 161. The notch 190 has a greater angle than the angle of the tapered lower end of the fulcrum member 185. The end of the rocker arm 182 opposite the arcuate shaped member 180 is provided with an upstanding boss 193 on the upper side of the wall 186, there being a recess in the under side of said wall beneath the boss 193 for reception of the upper rounded end 194 of the stem 195 of a metering valve, indicated generally at 196. A cross hole is provided in the stem 195 adjacent the upper end thereof for reception of an end portion 196 of a wire spring 197 which is generally C-shaped with the opposite end received in a conical recess 198 formed in the upper surface of the boss 193. The opposite end of stem 195 is provided with a valve head or member 200 which is adapted to control the flow of fluid through the valve 196. The valve 196 includes a seat, indicated generally at 201. This seat member includes a threaded portion 202 which is threaded and is threadably received in a threaded portion 203 of a bore 204 formed in the base 26. The outer end of the threaded portion 202 is provided with a slot 205 for reception of a screw driver or other suitable tool for adjustably turning said seat member which is adapted to be locked in adjusted position by a nut 206. The seat member 201 includes a reduced diameter portion 207 forming an annular chamber 208 with the wall of the bore 204. The bore 204 has a reduced diameter portion 210 which extends upwardly, as seen in Fig. 6, and which receives a reduced diameter portion 211 of the seat member 201. From the portion 211 the seat member has a tubular extension 212 of reduced diameter, the outer diameter of the extension 212 is smaller than the internal diameter of the bore portion 210 to thereby provide space for the passage of air about said extension 212. The latter is provided with a cross bore 215 so as to communicate with the interior of the extension 212. An axial passage 216 extends downwardly from the bottom of the interior of extension 212 and a valve seat, formed at the junction of the passage 216 with the interior of the extension 212, the valve 200 cooperates with said valve seat to control the flow of air through the meter valve 196. The upper end of the bore 210 is sealed with respect to the valve stem 195 by a flexible boot 218 attached to the tubular extension 219 of base 26 by means of a clip ring 220 for example, and secured to the stem by a clip 221. It is to be noted that the passage 216 is connected with the chamber 208 by a cross bore 222.

The ratio mechanism is loaded by an extension spring 225 formed with a hook 226 adjacent one end and engageable with a cross pin 227 secured to the side walls 187 of the rocker arm 182. The opposite end of the spring 225 is secured to a spring retainer 228 having a threaded axial bore in which is received the threaded end portion of an adjusting screw 230 having an adjusting head 231 in the outer end, said head 231 being received in a recess 232. The spring retainer 228 is provided with a laterally extending member 235, Fig. 3, having a notch 236 in the outer end thereof slidably receiving a pin 237 having one end secured in the base 26 by press fitting or otherwise so as to prevent rotation of said spring retainer 228 when the tension of spring 225 is adjusted.

The low differential means, indicated generally at 240, comprises a flexible diaphragm 241 marginally clamped to the upper free edge of a flange 242 formed integrally with and upstanding from the base 26. The marginal edge portion of said diaphragm 241 is secured between the free edge or end of the flange 242 and a ring 243 which is secured by screws 244. The flange, base portion within the flange and diaphragm 241 define a chamber 245 which is connected to atmosphere by the conduit 90 (Fig. 2) so that one side of the diaphragm 241 is subjected to atmospheric pressure and the other side is subjected to pressure in the control chamber 22. A central area of the diaphragm 241 is clamped between a pair of plates 246 and 247 below and above said diaphragm respectively. The diaphragm assembly is secured together by rivets 248, said plates being of smaller diameter than the inside diameter of the flange 242 so as to leave an annular convolution 249 of the diaphragm for flexing so that the diaphragm will have proper and free operative movements. The upper plate 247 is provided with a central tapped opening in which is received a threaded lower end, as viewed in Fig. 6, of a rod 250 which extends upwardly through an opening 251 in a fulcrum plate 252 disposed in upwardly spaced relationship to the diaphragm and supported by studs 253. The studs have their lower ends threaded for threaded reception in openings provided therefor in the ring 243. The fulcrum plate 252 is at the upper ends of said studs 253 and is secured thereto by screws 255. The fulcrum plate 252 has a fulcrum member 257 secured thereto by any suitable means such as screws, not shown. The upper end of the member 257 is provided with a V-shaped notch 258 in which is received the relatively sharp edge of a fulcrum member 259 which extends through an opening provided therefor in the upper wall 260 of a rocker arm or lever, indicated generally at 261. The fulcrum member 259 is secured to a plate 263 which is secured to the wall 260 by rivets 264. The member 259 is located intermediate the ends of the rocker arm 261 which is also channel shaped with side walls 265 depending from the wall 260. The rod 250 is provided with a hooked end 266 attached to a pin 267 secured adjacent the ends in the respective walls 265. The opposite end of the rocker arm 261 is provided with an outwardly extending recess for reception of the rounded end 269 of a valve stem 270 which is part of a metering valve, indicated generally at 271. The valve 271 includes a valve seat member 272 which is threadably received in the threaded portion of a bore 273 formed in an upraised portion 274 of the base 26. The seat member 272 is provided with an axial passage 275 which extends downwardly from a larger passage 276 opening at the upper end of the member 272. A movable valve member 278 is provided at the lower end of the stem 270 and slides in the bore 276. The valve member 278 cooperates with a seat formed at the bottom of the bore 276 where the passage 275 communicates with said bottom. The valve member 278 is profiled so as to permit air to pass said valve member when the valve is open. When said valve 271 is open, and valve 196 is also open, air may flow from the chamber 22 through the bore 276, passage 275 into a chamber 280 beneath the valve seat member 272 and thence through a passage 281 into the bore 210, through passage 216, cross passages 222, chamber 208 and thence to atmosphere through a passage 283, a solenoid valve 284 and connection 285 which, in Figs. 3 and 4, comprises a tube 286 connected by a fitting 287 with an elbow 288 attached to the upper end of the solenoid valve 284. The opposite end of said tube 286 is secured to a thickened section 289 of the base 26 by means of a nipple tube 290 and a fixture tube 291. There is a passage, not shown, in the thickened section 289 which communicates with the passages 83, as best shown in Fig. 2.

The low differential mechanism is loaded by an extension spring 293 having a hook shaped end 294 adapted to a cross pin 295 which has its ends secured in the walls 265 of the rocker arm 261. The opposite end of the spring is secured to a retainer 297 having an axial, threaded bore in which is received the threaded portion of an adjustment screw 298 having an adjusting head 299 received in a recess 300 formed in the base 26. The spring retainer 297 also is provided with a lateral extension 300 having a notch 301 in the outer end slidably receiving a guide pin 302 having one end fixed in the base and preventing rotation of said spring retainer 297.

The repressurization rate control means or mechanism comprises the capacitance or rate chamber 31 having a bleed connection 310 with the chamber 22. The wall 30 of the cover 27 has an opening 311 closed by a diaphragm 312. A ring 313 is secured to the wall 30 by brazing, soldering or other suitable means and is located in the chamber 22. The diaphragm 312 is marginally clamped between this ring and a ring 314 attached thereto by means of screws 315. Thus one side of the diaphragm 312 is subjected to the pressure in chamber 31 and the opposite side is subjected to the pressure in chamber 22.

On one side of the diaphragm 312 there is a plate 316 and on the opposite side is a plate 317. The plate 317 is of substantially smaller diameter than the diameter of the plate 316, the diameter of the latter plate being less than the inner diameter of rings 313 and 314 so as to leave an annular space for an annular convolution 320 of the diaphragm 312 which permits proper operative movements of said diaphragm. The plates 316 and 317 are secured together by rivets 321 or by any other suitable means and further serve to reinforce the central area of the diaphragm. The diaphragm 312 is adapted to control a metering valve, indicated generally at 325, which is attached to the upper end of a solenoid valve 326 which, in turn, is provided with a threaded end portion 327 screwed into the threaded upper end portion of a bore 328 formed in a thickened part 329 of the base 26.

The valve 325 includes a seat member 330 having a threaded axial bore threadably receiving an upwardly extending threaded part 331 of the solenoid valve 326. The seat member 330 is provided with a cross bore 333 and a passage 334 extending downwardly therefrom and having a seat with which a movable valve member 335 cooperates. The valve 335 includes a stem 336 slidable in an axial bore extending upwardly from the cross bore 333 and said stem 336 is provided with a head 338 urged into engagement with the lower plate 317 by a spring 340 which reacts between said head and the bottom of a recess in the adjacent end portion of the seat member 330. Air from the chamber 22 may escape to atmosphere when valve 325 is open and solenoid valve 326 is also open. The air from chamber 22 will then pass through the cross bore 333, bore 334 and into the solenoid valve 326, which will be described in greater detail hereinafter, into a chamber 342 formed by the lower end of the bore 328. From chamber 342, the air will pass through passage 83 and thence to atmosphere by way of the passage 83a. The valve member 335 is urged in the closing direction by a compression spring 345 located in the rate or capacitant chamber 31, said spring 345 reacting between the outer wall 346 of the chamber 31 and the plate 316 of the diagram assembly. The respective ends of the spring 345 are retained in position by a disc 347 secured to the outer wall 346 of the cover and the rivets 321.

Details of the solenoid valve 326 are shown in Fig. 7 and said valve comprises the valve seat member 350 externally threaded and threadably received in the threaded bore of the part 327. The valve seat member has an axial passage 351. The upper end of the seat member 350, as viewed in Fig. 7, is provided with a recess 352 in which is received a resilient seat element 353 formed of suitable flexible material. The seat element 353 comprises an annular ring having a central passage 354 aligned with the passage 351 and there is a cooperable valve member 355 for controlling the flow of air through the valve. The valve member 355 forms a part of a movable valve element, indicated generally at 356, and having a tubular portion 357 slidable in a bore 358 within the main body of the solenoid valve. The bore 358 is larger in diameter than passage 351 and is of sufficient length to permit operable movement of the valve element 356. A shoulder 360 which extends inwardly of the bore 358 serves as a stop for limiting opening movement of the valve element 356 and a shoulder 361, upwardly of the shoulder 360, is engaged by one end of a spring 362 which urges the valve element 356 in the valve closing direction. In the passage 364 of the end portion 331 there is disposed a filter 365. The valve 326 is provided with a pair of radially extending flnages 366 spaced longitudinally apart relative to the length of the valve 326 and within which is disposed an electric coil 368 which, when energized, will effect opening of the valve 355.

Inasmuch as the solenoid valve 284 is of substantially the same construction as solenoid valve 326 shown in Fig. 7, it will be unnecessary to describe the details of solenoid valve 284. It is also to be understood that any suitable type of electrically operated valve may be used in place of valve 326 or 284.

The electric system is shown diagrammatically in Fig. 2 and includes a source of power, shown as a battery 370, connected with a manually operated switch, indicated generally at 371. The switch includes a movable switch member 372 having a connection 373 with said battery 370. There is a fixed switch member 374 connected by a wire 375 with a normally closed Micro-switch, indicated generally at 376. The Micro-switch has a fixed switch member 377 and a movable switch member 378 adapted to be actuated by the rocker arm 261 of the low differential control mechanism. The switch member 377 is connected by a wire 379 with the coil of the solenoid valve 326, said coil having a connection 380 to the other pole of the battery 370. The switch 371 also has a fixed contact point 381 connected by a wire 382 with the coil of the solenoid valve 284, said coil having a connection 383 with the wire 380. Thus the solenoid coil of the valve 234 is also connected with the other pole of the battery 370. Referring to Figs. 3 and 6, the particular Micro-switch arrangement is shown. There is a leaf spring indicated generally at 390, of generally U-shape and having the free end of one arm 391 secured to the ring 243 of the low differential mechanism by a screw 392. Adjacent the opposite end of arm 391 there is a shoulder 394, Figs. 4 and 5, having an opening 395 thereto for reception of a reduced end portion 396 of an adjusting pin 397. The pin 397 has a threaded end portion 398 threadably received in an opening provided therefor in a thickened portion 399 of the base 26. The adjusting pin 397 has a notch 400 in the outer end thereof for reception of a suitable tool, such as a screw driver, whereby said pin may be adjusted. A lock nut 401 secures said pin in adjusted position. The other arm 402 of the strip 390 extends substantially horizontally and the free end portion of said arm portion 402 is disposed beneath the adjacent end of the rocker arm 261 and a movable plunger 404 of the Micro-switch 376 which is secured to the fulcrum plate 252 by any suitable means such as screws, not shown, said Micro-switch being insulated by a sheet of insulating material 405 disposed between the said switch and plate 252.

The side walls defining the rate or capacitance chamber are so formed as to leave open spaces 406 adjacent the ends and an open space 407 at a central region and a plate 410 is secured to the end wall 346 of said chamber 31 by means of brazing, soldering or the like. Portions of said plate extend over the open spaces 406 and 407 and said spaces provide room for attaching the mechanism to a suitable support. The attaching means and support are not shown herein as same do not constitute any part of the present mechanism.

Operation

The operation of the regulator may be best described in connection with Fig. 2 which shows the mechanism schematically or diagrammatically.

Let it be assumed that the airplane is on the ground at approximately sea level. At this time, the isobaric valve 69 will be open due to the pressure on the bellows 39, said pressure being substantially the same as atmospheric pressure. The cabin pressure will also be substantially the same as atmospheric pressure. All the other metering valves will be closed at this time.

When the aircraft begins to ascend, air is supplied to the cabin from a suitable source of pressure, such as the compressor or supercharger 24. The air in the control head or control pressure chamber 22 is vented to atmosphere through the open isobaric metering valve 66. The pressure in the cabin will be slightly higher than the pressure in the chamber 22 so that the pressure transmitted from the chamber 22, through conduit 21, to the chamber 20 of valve 11 will also be slightly lower than cabin pressure and the latter will act on the outflow valve member 19 to effect opening of the outflow valve so as to vent the cabin to atmosphere. The result is the unpressurized operation throughout a range up to any suitably predetermined altitude. In Fig. 8 the unpressurized range is indicated at 450 and is shown as being at approximately 5,000 feet.

Above the first predetermined altitude defining the upper limit of the unpressurized range and a second predetermined altitude, the aircraft will be in the isobaric range indicated at 451 in Fig. 8. The isobaric range may be up to any suitable altitude, such altitude being indicated at approximately 13,000 feet in Fig. 8, by way of illustration. In the isobaric range the cabin pressure will be maintained at substantially a constant level and the isobaric range is determined by a suitable setting of the calibrated isobaric spring 75, which loads the absolute pressure sensitive bellows 39 of the isobaric control 38. In the isobaric range of operation the bellows 39 so controls the valve 69 as to effect a metering action which will maintain the pressure in the chamber 22 at a substantially constant value. This, in turn, results in controlling the outflow valve 11 so as to maintain cabin pressure at substantially a constant predetermined value.

As the aircraft ascends in the isobaric range, the differential pressure between that in the control chamber 22 and ambient atmosphere will increase and at an altitude (8,000 as an example) within the isobaric range the differential pressure across the diaphragm 241 of the low differential device will become such as to effect opening of the low differential valve pin 278. However, due to the fact that the ratio valve pin 200 is seated, the opening of the low differential valve is ineffective to control the outflow of air from the control chamber 22. As the pressure differential between the control chamber 22 and atmosphere increases with continuing increase in aircraft altitude, the pressure differential across the diaphragm 86 will effect opening of the metering valve member 121 so as to meter air from the control chamber 22 to atmosphere. This results in a reduction in head pressure which causes the isobaric metering valve 66 to fully close.

Under normal operating conditions, it is generally desirable to maintain cabin pressure at a substantially constant fixed differential with respect to atmospheric pressure when the aircraft rises above the isobaric range. The differential thus maintained is relatively high and is indicated by the line 452 in Fig. 8. The high differential control takes over at this second predetermined altitude which is the upper limit of the isobaric range and under normal conditions the pressure in chamber 22, and hence in the cabin, is maintained at said high differential from said second predetermined altitude on upward. Under these conditions, the solenoid valve 284 is closed, said valve being then in its normal position. By action of the arm 261 of the low differential mechanism the switch 376 is open thus maintaining the solenoid 326 also in a closed position. The adjustment of the calibrated spring 127 will determine the point at which the high differential mechanism will take over control.

Should it be desired to provide a lower differential pressure in the cabin when the aircraft is at the higher altitudes, such lower differential may be provided by moving the switch member 372 to the dotted line position shown in Fig. 2, whereat the fixed contact 381 is engaged. Thus the solenoid valve 284 is energized and the valve opened. As previously described, as the aircraft ascends in the isobaric range, the differential of pressure across the diaphragm 241 of the low differential mechanism 261 will effect opening of the metering valve member 278 of said low differential mechanism. However, no air will be metered by this valve while the valve member 200 of the ratio control mechanism is seated. The adjustment of the spring 225, of the ratio mechanism 145, determines the point at which the ratio mechanism will begin to function effectively. As shown in Fig. 8, by way of example only, the ratio mechanism will take over control at a little over 35,000 feet and will control the pressure in the chamber 22, and hence in the cabin, in accordance with a predetermined ratio until the aircraft reaches an altitude of approximately 48,000 feet, for example, as indicated by line 452 in Fig. 8. Due to the fact that the low differential metering valve 278 has already been opened when the ratio range is reached, opening of the valve member 200 of the ratio mechanism, so as to meter air from the chamber 22 to atmosphere, will result in a lowering of the pressure in said chamber 22 and cause the high differential meter pin to close completely so that the control will be entirely by the ratio mechanism in the ratio range. Inasmuch as the low differential metering valve 278 is substantially fully open when the ratio mechanism begins to take over, there will be no differential of pressure across the boot 218 and hence no interference with the proper function of the ratio mechanism.

As the aircraft continues to ascend on ratio operation, the difference of pressure between the control chamber 22 and atmosphere will decrease. As this occurs the low differential metering pin will be moved towards its seat and will reach a metering position under predetermined differential pressure conditions determined by the setting of the calibrated spring 293. When the low differential mechanism is elective in controlling the escape of air from chamber 22, the reduction of the differential of pressure between that in the chamber 22 and atmosphere is limited and causes the ratio control mechanism to move the metering valve member 200 to an open portion whereat it ceases to have any effect upon the metering of air from the chamber 22 to atmosphere. When the aircraft has reached the predetermined altitude whereat the low differential mechanism takes over control, there will be maintained a predetermined low differential pressure between that in the control chamber, as indicated by the line 453 in Fig. 8, and, hence in the cabin, with respect to atmosphere. It will be noted that under low differential pressure conditions, there is a differential pressure across the boot 218 of the metering valve 195 but the ratio mechanism is not controlling the pressure during this phase of operation and, hence, such differential pressure across said boot does not have any effect.

It is to be noted that when the aircraft has risen above the third predetermined altitude, which marks the lower limit of the ratio range, actuation of the switch 371 (manually or by some other means), so that the member 372 engages the contact 381, will cause either the ratio mechanism to take over control if the aircraft is within the ratio range or will cause the low differential mechanism to take over control if the aircraft has ascended above the fourth predetermined altitude which marks the lower limit of the low differential range.

The mechanism is considered as under combat operation control when the switch member 372 is in contact with the contact member 381. Should it be desired to return to normal operation, the switch member 372 is moved to the full line position shown in Fig. 2, which is considered the normal position, so that switch member 372 contacts the fixed contact member 374 which leads to the normally closed Micro-switch 376, said switch being set to open just as the upper limit of the isobaric range is reached and to be closed as the control in the ratio range takes over. The solenoid valve 284 is then de-energized, causing the valve thereof to close so as to render the ratio and low differential mechanisms ineffective in controlling the pressure in the chamber 22. Inasmuch as the rocker arm 261 of the low differential mechanism 240 has moved to position whereat the valve member 278 is in a metering position and said rocker arm has moved sufficiently in a clockwise direction so as to permit the return of the plunger 404 of the Micro-switch 376, said Micro-switch is closed and the solenoid valve 326 is energized to provide communication through the passages 83 and 83a to atmosphere. The repressurization rate control is then connected with atmosphere so that the metering of air through the valve 325 of said repressurization rate control will effect control of the rate of pressure change in the control chamber 22. The valve member 335 of the repressurization rate control mechanism is controlled by the diaphragm 312 which responds to the differential of pressure on opposite sides thereof. On one side of said diaphragm 312 is the pressure in chamber 31 and on the opposite side is the pressure in chamber 22. The chamber 31 is connected with chamber 22 by way of the calibrated bleed orifice 310 and, hence, the valve 325 will be controlled so as to control the rate of pressure change in the chamber 22 in accordance with the rate at which air will bleed through the orifice 310. Thus the change from low differential to high differential is controlled by the repressurization rate control mechanism which is a pneumatic control.

Adjusting screw 397 determines the opening of the Micro-switch by the differential rocker arm. The mechanism may be so adjusted that the Micro-switch 376 will be open and the dive solenoid valve 326 deenergized and the valve thereof closed when the mechanism is on high differential. Thus the repressurization rate control is effective only when the change is being made from low differential or ratio control to high differential control. Further, the repressurization rate control is ineffective when the mechanism is operating on isobaric control due to the fact that the head pressure does not increase substantially during this range of operation. On low differential and ratio operation, even though the Micro-switch is in the closed position, the dive solenoid will not be energized because the manual cockpit switch 371 is in the combat position and, consequently, no energy is supplied to the Micro-switch. The result is that the repressurization rate control is effective only during the transition from combat to normal high differential operation and is not effective at any other time.

Where the unit 23 is shown and described as being installed in the pressurized space of the cabin, it is to be understood that said unit may be installed in an unpressurized region of the aircraft. In such case, the plug 36 with its bleed 35 is not used. Instead a solid plug is installed and the cabin pressure is then admitted to the system by some other means. For example, pressure may be admitted into the chamber 20 of the valve 11, it being understood that the control pressure chamber may be considered as including the conduit 21 and chamber 20 as well as the chamber 22 of the unit 23. This is true whether the unit 23 is installed in a pressurized region of the aircraft or in an unpressurized region.

I claim:

1. In mechanism for controlling the pressure within an enclosure having an opening therein for the flow of fluid relative to said enclosure: valve means for controlling said opening including a pressure sensitive part subjected on one side to enclosure pressure; means defining a control pressure chamber, the other side of said part being subjected to the pressure in said chamber; means for controlling the pressure in said control chamber including, absolute pressure responsive means adapted to control the flow of fluid relative to said chamber; differential pressure responsive means adapted to control the flow of fluid relative to said chamber, said means including a pressure responsive member responsive to variations in the differential of pressure on opposite sides thereof and subjected on one side to pressure outside the enclosure and adapted to maintain a predetermined fixed differential pressure in the control chamber with respect to ambient atmospheric pressure; pressure responsive means adapted to control the flow of fluid relative to said chamber, said means being adapted to maintain the pressure in the chamber at a predetermined ratio with respect to pressure outside said enclosure; differential pressure responsive means adapted to control the flow of fluid relative to said enclosure, said differential pressure responsive means including a movable member subjected on one side to ambient atmospheric pressure and adapted to maintain the pressure in the control chamber at a predetermined fixed differential with respect to ambient atmospheric pressure and at a lower value than the first mentioned fixed differential pressure; pressure responsive means for controlling the rate of pressure change in the control chamber, said means being adapted to control the flow of fluid relative to said control chamber; electrical means for controlling the effective operation of the rate of change control means; and electrical means for controlling the effective operation of the ratio and low differential pressure control means.

2. In mechanism for controlling the pressure within an enclosure: enclosure pressure control means operable to control the pressure in said enclosure including a pressure sensitive element subjected on one side to enclosure pressure; a control chamber, said pressure sensitive element being exposed on the other side to pressure in said chamber; means for controlling the pressure in said chamber including absolute pressure responsive means for controlling the flow of fluid relative to said chamber so as to maintain a substantially constant pressure level within said enclosure in one range of operation when the enclosure is between a first predetermined altitude and a second predetermined altitude; differential pressure responsive means for controlling the flow of fluid relative to said chamber and adapted to maintain a substantially fixed predetermined pressure differential between that in the chamber and ambient atmosphere when the enclosure is above said second predetermined altitude; outlet connection means for said chamber; ratio control means controlling the flow through said outlet connection means, said ratio control means being adapted to control the pressure in the control pressure chamber so as to maintain a predetermined ratio between the pressure in said chamber and ambient atmospheric pressure; differential pressure responsive means for controlling said outlet connection means so as to maintain a substantially fixed differential pressure between that in the control chamber and ambient atmospheric pressure, said substantially fixed differential pressure being lower than the first mentioned fixed differential pressure; a normally closed solenoid valve controlling said outlet connection means; a second outlet connection means for the control chamber; rate of pressure change control means for said second outlet connection means for controlling the outflow of air from said control chamber so as to limit the rate of pressure change in said chamber; a normally closed solenoid valve controlling said second outlet connection means; electrical circuits for the solenoid valves including a switch having two positions, said switch when in one position connecting the first mentioned solenoid valve with a source of electrical energy so as to effect opening of said valve; and a normally closed switch having a connection with the second mentioned solenoid valve and controlled by the low differential pressure control means.

3. In a pressure control mechanism: walls defining a control pressure chamber having an inlet passage means and an outlet passage means; means for controlling the pressure in said chamber including absolute pressure responsive means subjected to the pressure in said chamber and adapted to control the flow of fluid through one of said passage means for maintaining a substantially constant pressure level in the control chamber in an isobaric range of operation; high differential control means including a movable wall responsive to variations in the differential of pressure between that in the control chamber and ambient atmosphere and adapted to control the flow of fluid through one of said passage means so as to maintain a substantially fixed differential pressure between that in the control chamber and ambient atmosphere in a high differential range of operation above the isobaric range and beginning at the upper limit of said isobaric range; ratio control means having parts subjected to the pressure in the control chamber and ambient atmospheric pressure, said ratio control means being adapted to control the flow through one of said passage means so as to maintain a predetermined ratio between the pressure in the control chamber and ambient atmosphere in a ratio range of operation above the isobaric range; low differential pressure control means having a movable part responsive to variations in the differential of pressure between that in the control chamber and ambient atmosphere and adapted to control the flow of fluid through the passage means controlled by the ratio control means so as to maintain a substantially fixed predetermined differential pressure between that in the control chamber and ambient atmosphere at a lower value than the first mentioned fixed differential pressure in a low differential range of operation above the ratio range; means for controlling the rate of pressure change within the control chamber having a movable wall subjected on one side to pressure in said control chamber, means defining a capacitance chamber having a bleed connection with the control chamber, the opposite side of said movable wall being subjected to the pressure in said capacitance chamber; means for rendering the ratio and low differential control means inoperative; means for rendering the rate of change control means inoperative; and means for controlling the control means of the ratio and low differential control means and the rate of change control means.

4. In a pressure control mechanism: walls defining a control pressure chamber having an inlet passage means and an outlet passage means; high differential control means including a movable wall responsive to variations in the differential of pressure between that in the control chamber and ambient atmosphere and adapted to control the flow of fluid through one of said passage means so as to maintain a substantially fixed differential pressure between that in the control chamber and ambient atmosphere in a high differential range of operation; ratio control means having parts subjected to the pressure in the control chamber and ambient atmospheric pressure, said ratio control means being adapted to control the flow through one of said passage means so as to maintain a predetermined ratio between the pressure in the control chamber and ambient atmosphere in a ratio range of operation above the isobaric range; low differential pressure control means having a movable part responsive to variations in the differential of pressure between that in the control chamber and ambient atmosphere and adapted to control the flow of fluid through the passage means controlled by the ratio control means so as to maintain a substantially fixed predetermined differential pressure between that in the control chamber and ambient atmosphere at a lower value than the first mentioned fixed differential pressure in a low differential range of operation above the ratio range; means for controlling the rate of pressure change within the control chamber having a movable wall subjected on one side to pressure in said control chamber, means defining a capacitance chamber having a bleed connection with the control chamber, the opposite side of said movable wall being subjected to the pressure in said capacitance chamber; means for rendering the ratio and low differential control means inoperative; means for rendering the rate of change control means inoperative; and electrical means, including a manually operable switch for selectively controlling the control means of the ratio and low differential control means and the rate of change control means.

5. In a pressure control mechanism: walls defining a control pressure chamber having an inlet passage means and an outlet passage means; high differential control means including a movable wall responsive to variations in the differential of pressure between that in the control chamber and ambient atmosphere and adapted to control the flow of fluid through one of said passage means so as to maintain a substantially fixed differential pressure between that in the control chamber and ambient atmosphere in a high differential range of operation; low differential pressure control means having a movable part responsive to variations in the differential of pressure between that in the control chamber and ambient atmosphere and adapted to control the flow of fluid through one of said passage means so as to maintain a substantially fixed predetermined differential pressure between that in the control chamber and ambient atmosphere at a lower value than the first mentioned fixed differential pressure in a low differential range of operation; and means for controlling the rate of pressure change within the control chamber having a movable wall subjected on one side to pressure in said control chamber, means defining a capacitance chamber having a bleed connection with the control chamber, the opposite side of said movable wall being subjected to the pressure in said capacitance chamber.

6. In a pressure control mechanism: walls defining a control pressure chamber having an inlet passage means and an outlet passage means; high differential control means including a movable wall responsive to variations in the differential of pressure between that in the control chamber and ambient atmosphere and adapted to control the flow of fluid through one of said passage means so as to maintain a substantially fixed differential pressure between that in the control chamber and ambient atmosphere in a high differential range of operation; ratio control means having parts subjected to the pressure in the control chamber and ambient atmospheric pressure, said ratio control means being adapted to control the flow through one of said passage means so as to maintain a predetermined ratio between the pressure in the control chamber and ambient atmosphere in a ratio range of operation; and low differential pressure control means having a movable part responsive to variations in the differential of pressure between that in the control chamber and ambient atmosphere and adapted to control the flow of fluid through the passage means controlled by the ratio control means so as to maintain a substantially fixed predetermined differential pressure between that in the control chamber and ambient atmosphere at a lower value than the first mentioned fixed differential pressure in a low differential range of operation above the ratio range.

7. In a pressure control mechanism: walls defining a control presure chamber having an inlet passage means and an outlet passage means; ratio control means having parts subjected to the pressure in the control chamber and ambient atmospheric pressure, said ratio control means being adapted to control the flow through one of said passage means so as to maintain a predetermined ratio between the pressure in the control chamber and ambient atmosphere in a ratio range of operation; and low differential pressure control means having a movable part responsive to variations in the differential of pressure between that in the control chamber and ambient atmosphere and adapted to control the flow of fluid through the passage means controlled by the ratio control means so as to maintain a substantially fixed predetermined low differential pressure between that in the control chamber and ambient atmosphere in a range of operation above the ratio range.

8. In pressure control mechanism: walls defining a control pressure chamber having inlet passage means and outlet passage means; means for controlling the pressure in said chamber including ratio control means adapted to control the flow of fluid relative to said chamber so as to maintain a predetermined ratio between the pressure in the control chamber and ambient atmosphere in a ratio range of operation; low differential pressure control means having a movable part responsive to variations in the differential of pressure on opposite sides thereof for controlling the flow of fluid relative to said chamber so as to maintain a substantially fixed predetermined differential pressure between that in the control chamber and ambient atmospheric pressure in a low differential range above said ratio range; and rate of change control means for controlling the rate of pressure change within the chamber, said rate of change control means controlling one of said passage means and including a movable wall responsive to variations in the differential of pressure on opposite sides thereof, one side of said movable wall being subjected to pressure in said chamber, and means defining a capacitance chamber having a restricted bleed connection with the control pressure chamber, the opposite side of said movable wall being subjected to the pressure in said capacitance chamber.

9. In pressure control mechanism: ratio control means having pressure responsive means subjected to a pressure to be controlled and to a reference pressure so as to maintain a predetermined ratio between said pressure to be controlled and another pressure; differential pressure control means having a movable part responsive to variations in the differential of pressure on opposite sides thereof for maintaining a pressure to be controlled at a predetermined differential pressure with respect to said other pressure; rate of change control means for limiting the rate of change of said pressure to be controlled; electrical means for controlling the rate of change means; and switch means controlled by the differential pressure control means for controlling the rate of change control means.

10. In mechanism for controlling the pressure in the control chamber of pressure regulating mechanisms: ratio control means adapted to control the flow of fluid relative to said chamber so as to maintain a predetermined ratio between the pressure in the control chamber and ambient atmosphere in a ratio range of operation; low differential pressure control means having a movable part responsive to variations in the differential of pressure on opposite sides thereof for controlling the flow of fluid relative to said chamber so as to maintain a substantially fixed predetermined differential pressure between that in the control chamber and ambient atmospheric pressure in a low differential range above said ratio range; and rate of change control means for controlling the rate of pressure change within the chamber, said rate of change control means controlling one of said passage means and including a movable wall responsive to variations in the differential of pressure on opposite sides thereof.

11. Means for controlling the pressure in the control chamber of pressure regulating mechanism: absolute pressure responsive means for controlling the pressure in said control chamber and maintaining said pressure at a substantially constant pressure level in an isobaric range of operation; means defining a passage having an inlet connection with the control chamber and an outlet; ratio control means including a valve controlling said outlet and pressure responsive means adapted to actuate said valve; differential pressure control means having a valve controlling said inlet connection, said differential pressure control means having a movable wall responsive to variations in the differential of pressure on opposite sides thereof; and means for controlling said passage for rendering said ratio and said differential pressure control means ineffective.

12. In a pressure control mechanism: walls defining a control pressure chamber having an inlet passage means and an outlet passage means; ratio control means having parts subjected to the pressure in the control chamber and ambient atmospheric pressure, said ratio control means being adapted to control the flow through one of said passage means so as to maintain a predetermined ratio between the pressure in the control chamber and ambient atmosphere in a ratio range of operation; low differential pressure control means having a movable part responsive to variations in the differential of pressure between that in the control chamber and ambient atmosphere and adapted to control the flow of fluid through the passage means controlled by the ratio control means so as to maintain a substantially fixed predetermined differential pressure between that in the control chamber and ambient atmosphere at a lower value than the first mentioned fixed differential pressure in a low differential range of operation above the ratio range; and means for rendering said ratio control means and low differential pressure control means ineffective for controlling the pressure in said control chamber.

13. In pressure control mechanism: ratio control means having pressure responsive means subjected to a pressure to be controlled and to a reference pressure so as to maintain a predetermined ratio between said pressure to be controlled and another pressure; differential pressure control means having a movable part responsive to variations in the differential of pressure on opposite sides thereof for maintaining a pressure to be controlled at a predetermined differential pressure with respect to said other pressure; rate of change control means for limiting the rate of change of said pressure to be controlled; electrical means for controlling the rate of change means; switch means controlled by the differential pressure control means for controlling the rate of change control means; and means for adjusting the switch means so as to vary the pressure value whereat the differential pressure control means will effect control of the rate of change control means.

14. In mechanism for controlling the pressure in the control chamber of pressure regulating mechanism: ratio control means adapted to control the flow of fluid relative to said chamber so as to maintain a predetermined ratio between the pressure in the control chamber and ambient atmosphere in a ratio range of operation; low differential pressure control means having a movable part responsive to variations in the differential of pressure on opposite sides thereof for controlling the flow of fluid relative to said chamber so as to maintain a substantially fixed predetermined differential pressure between that in the control chamber and ambient atmospheric pressure; rate of change control means for controlling the rate of pressure change within the chamber, said rate of change control means controlling one of said passage means and including a movable wall responsive to variations in the differential of pressure on opposite sides thereof; and means controlled by the low differential pressure control means for rendering said rate of change control means inoperative under predetermined operative conditions for rendering said rate of change control means effective under other operating conditions.

15. In a pressure control mechanism: walls defining a control pressure chamber having an inlet passage means and an outlet passage means; high differential control means including a movable wall responsive to variations in the differential of pressure between that in the control chamber and ambient atmosphere and adapted to control the flow of fluid through one of said passage means so as to maintain a substantially fixed differential pressure between that in the control chamber and ambient atmosphere in a high differential range of operation; low differential pressure control means having a movable part responsive to variations in the differential of pressure between that in the control chamber and ambient atmosphere and adapted to control the flow of fluid through one of said passage means so as to maintain a substantially fixed predetermined differential pressure between that in the control chamber and ambient atmosphere at a lower value than the first mentioned fixed differential pressure in a low differential range of operation; means for controlling the rate of pressure change within the control chamber having a movable wall subjected on one side to pressure in said control chamber; and means, controlled by the low differential pressure control means, for rendering said rate of pressure change control means inoperative.

16. In a pressure control mechanism: walls defining a control pressure chamber having an inlet passage means and an outlet passage means; high differential control means including a movable wall responsive to variations in the differential of pressure between that in the control chamber and ambient atmosphere and adapted to control the flow of fluid through one of said passage means so as to maintain a substantially fixed differential pressure between that in the control chamber and ambient atmosphere in a high differential range of operation; low differential pressure control means having a movable part responsive to variations in the differential of pressure between that in the control chamber and ambient atmosphere and adapted to control the flow of fluid through one of said passage means so as to maintain a substantially fixed predetermined differential pressure between that in the control chamber and ambient atmosphere at a lower value than the first mentioned fixed differential pressure in a low differential range of operation, said low differential pressure control means overriding the high differential pressure control means under predetermined pressure conditions; means for switching the control from the high to the low differential pressure control means and vice versa and means for controlling the rate of pressure change in the control pressure chamber when the pressure is changing from the low differential to the high differential range so that the pressure change in the control chamber is at a slower rate when the pressure is increasing than when said pressure is decreasing.

17. The invention defined by claim 16 including means controlled by the low differential pressure control means for rendering the rate of pressure change control means effective only when the pressure in the control chamber is increasing.

18. In pressure control mechanism: differential pressure control means having a movable part responsive to variations in the differential of pressure on opposite sides thereof for maintaining a pressure to be controlled at a predetermined differential pressure with respect to a reference pressure; rate of change control means for limiting the rate of change of said pressure to be controlled; a valve normally inactivating said rate of change control means; and means, controlled by said differential pressure control means, for operating said valve to activate said rate of change control means for operation in one direction of pressure change only.

19. In pressure control mechanism: means defining a control pressure chamber; differential pressure control means having a movable part responsive to variations in the differential of pressure between that in said control chamber and a reference pressure; rate of change control means for limiting the rate of change of said chamber pressure; and means, controlled by said differential control means, for controlling said rate of change control means.

20. In pressure control mechanism: means defining a control pressure chamber; means defining a passage having an inlet and an outlet; ratio control means, including a valve controlling said outlet and pressure responsive means adapted to actuate said valve in accordance with a predetermined ratio between the pressure in said chamber and a reference pressure; and differential pressure control means having a valve controlling the inlet to said passage, said differential pressure control means including a movable wall responsive to variations in the differential of pressure between that in said chamber and said reference pressure.

21. In pressure control means: means defining a control pressure chamber; absolute pressure responsive means, responsive to the pressure in said control chamber for controlling pressure in said chamber at a substantially constant pressure level in an isobaric range of operation; means defining a passage having an inlet connection with the control chamber and an outlet; ratio control means including a valve controlling said outlet and pressure responsive means adapted to actuate said valve, said pressure responsive means being subjected to control chamber pressure; a differential pressure control means having a valve controlling said inlet, said differential pressure control means having a movable wall subjected on one side to control chamber pressure; and means for controlling said passage for rendering said ratio and said differential pressure control means ineffective.

22. Means for controlling the pressure in the control chamber of pressure regulating mechanism: means defining a passage having an inlet connection with the control chamber and an outlet; ratio control means including a valve controlling said outlet and pressure responsive means adapted to actuate said valve; differential pressure control means having a valve controlling said inlet connection, said differential pressure control means having a movable wall responsive to variations in the differential of pressure on opposite sides thereof; and means for controlling said passage for rendering said ratio and said differential pressure control means ineffective.

23. In pressure control mechanism: differential pressure control means having a movable part responsive to variations in the differential of pressure on opposite sides thereof for maintaining a pressure to be controlled at a predetermined differential pressure with respect to a reference pressure; rate of change control means for limiting the rate of change of said pressure to be controlled; a valve normally inactivating said rate of change control means; and means, controlled by said differential pressure control means, for operating said valve to render said rate of change control means operative only for limiting the rate of change from a lower to a higher pressure.

24. In a pressure control mechanism: walls defining a control pressure chamber having an inlet passage means and an outlet passage means; isobaric control means including pressure responsive means, responsive to the pressure in said control chamber, for maintaining the pressure in said chamber at a substantially constant value; high differential control means including a movable wall responsive to variations in the differential of pressure between that in the control chamber and ambient atmosphere and adapted to control the flow of fluid through one of said passage means so as to maintain a substantially fixed differential pressure between that in the control chamber and ambient atmosphere in a high differential range of operation; low differential pressure control means having a movable part responsive to variations in the differential of pressure between that in the control chamber and ambient atmosphere and adapted to control the flow or fluid through one of said passage means so as to maintain a substantially fixed predetermined differential pressure between that in the control chamber and ambient atmosphere at a lower value than the first mentioned fixed differential pressure in a low differential range of operation; and means for controlling the rate of pressure change within the control chamber having a movable wall subjected on one side to pressure in said control chamber, means defining a capacitance chamber having a bleed connection with the control chamber, the opposite side of said movable wall being subjected to the pressure in said capacitance chamber.

25. In a pressure control mechanism: walls defining a control pressure chamber having an inlet passage means and an outlet passage means; isobaric control means including pressure responsive means, responsive to the pressure in said control chamber, for maintaining the pressure in said chamber at a substantially constant value; high differential control means including a movable wall responsive to variations in the differential of pressure between that in the control chamber and ambient atmosphere and adapted to control the flow of fluid through one of said passage means so as to maintain a substantially fixed differential pressure between that in the control chamber and ambient atmosphere in a high differential range of operation; low differential pressure control means having a movable part responsive to variations in the differential of pressure between that in the control chamber and ambient atmosphere and adapted to control the flow of fluid through one of said passage means so as to maintain a substantially fixed predetermined differential pressure between that in the control chamber and ambient atmosphere at a lower value than the first mentioned fixed differential pressure in a low differential range of operation; means for rendering one of said differential pressure control means inoperative; and means for controlling the rate of pressure change within the control chamber having a movable wall subjected on one side to pressure in said control chamber, means defining a capacitance chamber having a bleed connection with the control chamber, the opposite side of said movable wall being subjected to the pressure in said capacitance chamber.

26. In pressure control mechanism: walls defining a control pressure chamber; means defining a passage leading from said control pressure chamber to a zone of atmospheric pressure; ratio control means including a valve controlling flow through said passage and pressure responsive means responsive to control chamber pressure and atmospheric pressure to modulate said valve within a relatively low altitude range and to hold said valve open within a relatively higher altitude range; and differential pressure control means having a second valve controlling flow through said passage, said differential pressure control means including a movable wall responsive to control chamber pressure and atmospheric pressure to modulate the second valve within said relatively higher altitude range and to hold the second valve open within said relatively lower altitude range.

27. Means for controlling the pressure in the control chamber of pressure regulating mechanism: means defining a passage leading from the control chamber for flow of fluid relative thereto; ratio control means including a valve controlling flow through said passage and pressure responsive means responsive to control chamber pressure and atmospheric pressure to modulate said valve within a relatively low altitude range and to hold said valve open within a relatively higher altitude range; and differential pressure control means having a second valve controlling flow through said passage, said differential pressure control means including a movable wall responsive to control chamber pressure and atmospheric pressure to modulate the second valve within said relatively higher altitude range and to hold the second valve open within said relatively lower altitude range.

28. Means for controlling the pressure in the control chamber of pressure regulating mechanism: absolute pressure responsive means for controlling the pressure in said control chamber and maintaining said pressure at a substantially constant pressure level in an isobaric range; means defining a passage leading from said control pressure chamber for flow of fluid relative thereto; ratio control means including a valve controlling flow through said passage and pressure responsive means responsive to control chamber pressure and atmospheric pressure to modulate said valve within a relatively low altitude range and to hold said valve open within a relatively higher altitude range; and differential pressure control means having a second valve controlling flow through said passage, said differential pressure control means including a movable wall responsive to control chamber pressure and atmospheric pressure to modulate the second valve within said relatively higher altitude range and to hold the second valve open within said relatively lower altitude range.

References Cited in the file of this patent

UNITED STATES PATENTS

| | | |
|---|---|---|
| 2,391,197 | Schwien | Dec. 18, 1945 |
| 2,463,487 | Widgery et al. | Mar. 1, 1949 |
| 2,466,465 | Morris | Apr. 5, 1949 |
| 2,498,633 | Arthur | Feb. 28, 1950 |
| 2,510,976 | Herrala et al. | June 13, 1950 |
| 2,513,332 | Kemper | July 4, 1950 |
| 2,590,330 | Krueger | Mar. 25, 1952 |
| 2,620,719 | Price | Dec. 9, 1952 |